United States Patent [19]

Ono et al.

[11] Patent Number: 5,111,347
[45] Date of Patent: May 5, 1992

[54] METHOD OF DETECTING TAPE EDGE

[75] Inventors: Hitoshi Ono; Fumito Komatsu, both of Nagano, Japan

[73] Assignee: K.K. Sankyo Seiki Seisakusho, Nagano, Japan

[21] Appl. No.: 419,249

[22] Filed: Oct. 10, 1989

[30] Foreign Application Priority Data

Oct. 11, 1988 [JP] Japan .................... 63-255327

[51] Int. Cl.⁵ .................................... G11B 5/56
[52] U.S. Cl. ........................ 360/75; 360/78.02; 360/77.12
[58] Field of Search .......... 360/75, 77.12, 78.02, 360/78.13

[56] References Cited

U.S. PATENT DOCUMENTS

| | | | |
|---|---|---|---|
| 4,476,503 | 10/1984 | Solhjell | 369/56 X |
| 4,786,984 | 11/1988 | Seeman | 360/31 |
| 4,802,030 | 1/1989 | Henry et al. | 360/77.12 X |

Primary Examiner—Vincent P. Canney
Assistant Examiner—David L. Robertson
Attorney, Agent, or Firm—Sughrue, Mion, Zinn, Macpeak & Seas

[57] ABSTRACT

A method of detecting an edge of a magnetic tape, using a magnetic head device with a magnetic head capable of reading after writing and having a read gap and a write gap, and a switch for selectively electrically connecting the write gap to a write circuit and a read circuit. The steps of the method are: running the tape while moving the magnetic head from a predetermined initial position in the widthwise of the tape until the magnetic head reaches the edge of the tape to record a signal on the tape; subsequently rewinding the tape to the predetermined initial position to return the magnetic head to a position of the tape where the signal has been recorded; subsequently, under the condition of electrically connecting the write gap to the read circuit to cause the write gap to serve as a read gap, running the tape while causing the magnetic head to follow the signal recorded on the tape to read the signal; and subsequently comparing the read signal with a reference value to detect the edge of the tape.

13 Claims, 4 Drawing Sheets

METHOD OF DETECTING TAPE EDGE

BACKGROUND OF THE INVENTION

1. Field of the Invention

This invention relates to a method of detecting an edge of a tape with a magnetic head device, and to a method of detecting a tape edge applicable to a tape recorder used with a computer for storing back-up data.

2. Prior Art

In a tape recorder using a magnetic tape as a recording medium, a head gap is required to accurately trace a predetermined recording track. The recording track on the magnetic tape is determined or set, using the edge of the magnetic tape as a reference. Therefore, in order that the head gap can accurately trace the predetermined recording track, it is necessary to detect the tape edge beforehand. For example, particularly when a magnetic tape is used in a tape recorder used in a computer for storing back-up data, the magnetic tape is divided into many recording tracks, and therefore it is important to detect the tape edge beforehand.

In one known method of detecting a tape edge, a magnetic head device for recording and reproducing signals is utilized for such tape edge detection. One example of such method is disclosed in U.S. Pat. No. 4,476,503. In this conventional method of the U. S. patent, as shown in FIG. 13, there is employed a magnetic head 11 capable of reading after writing and having a write gap Wg and a read gap Rg which are arranged in juxtaposed relation in the direction of travel of a tape 4. A screw 17 is threaded into the magnetic head 11, and is adapted to be rotated by a stepping motor 15, so that the magnetic head 11 can be moved in the direction of the width of the tape 4. When the tape 4 travels or runs from the left to the right in FIG. 13, a signal is recorded on the tape 4 by the write gap Wg, and also the recorded signal is read by the read gap Rg. In this manner, the signal is recorded and read, and at this time the magnetic head 11 is moved in the direction of the width of the tape 4. When the center of the read gap Rg registers with the edge 4a of the tape 4, the output level of the signal read by the read gap Rg becomes ½. Therefore, the position where the output level of the signal read by the read gap Rg becomes ½ is detected, and this position is determined as the tape edge position.

In the tape edge detection method described in the above-mentioned U. S. patent, the signal written by the write gap Wg is read by the read gap Rg. When the output level of the thus read signal reaches the predetermined level, this position is determined or set as the tape edge position. Therefore, the tape edge is detected by the center of the read gap Rg.

In the case where a single magnetic head is provided with a write gap and a read gap, the center of the write gap is often out of alignment with the center of the read gap in the direction of travel of the tape. This results in a problem that the signal written by the write gap is detected by the read gap displaced or offset relative to the write gap, thereby causing an error in the result of the tape edge detection. Another problem is that an azimuth deviation developing when mounting the magnetic head on a tape drive device also leads to an error in the result of the tape edge detection.

SUMMARY OF THE INVENTION

An object of this invention is to solve the above deficiencies of the prior art. Another object of this invention is to provide a tape edge detection method in which a write gap of a read-after-write magnetic head writes a signal and also reads this signal so as to detect the tape edge, thereby ensuring that an error in the result of the tape edge detection will not occur even when the center of the read gap is out of alignment with the center of the write gap and also even when an azimuth deviation develops when mounting the magnetic head on a tape drive device.

According to the present invention, there is provided a method of detecting an edge of a magnetic. The present invention uses a magnetic head device with a magnetic head capable of reading after writing and having a read gap and a write gap, and circuitry for selectively connecting the write gap to a write circuit and a read circuit. The steps of the method are:

(a) running the tape and moving the magnetic head from a predetermined initial position in the direction of the width of the tape until the magnetic head reaches the edge of the tape, to thereby record a signal on the tape;

(b) subsequently rewinding the tape to an initial position and returning the magnetic head to a position of the tape where said signal is recorded;

(c) subsequently connecting the write gap to the read circuit to cause the write gap to serve as a read gap, and running the tape, and causing the magnetic head to follow the signal recorded on the tape to thereby read the signal; and subsequently comparing the read signal with a reference value to detect the edge of the tape.

Further, according to the present invention, there is provided a method of detecting an edge of a magnetic tape, using a magnetic head device with a magnetic head capable of reading after writing and having a read gap and a write gap, and circuitry for selectively connecting the write gap to a write circuit and a read circuit. The steps of the method are:

(a) setting the magnetic head at a predetermined initial position and subsequently running the tape for a predetermined length of time to thereby record a signal on the tape by the use of the write gap;

(b) subsequently moving the magnetic head in the direction of the width of the tape until the write gap reaches the edge of the tape while recording the signal, to thereby record the signal on the tape;

(c) subsequently rewinding the tape to an initial position and returning the magnetic head to a position of the tape where the signal is recorded;

(d) subsequently connecting the write gap to the read circuit to cause the write gap to serve as a read gap, and running the tape, and causing the magnetic head to follow the signal recorded on the tape to thereby read the signal; and (e) subsequently comparing the read signal with a reference value to detect the edge of the tape.

DETAILED DESCRIPTION OF THE PREFERRED EMBODIMENT

A tape edge detection method according to the present invention will now be described with reference to the drawings.

Figure 1:
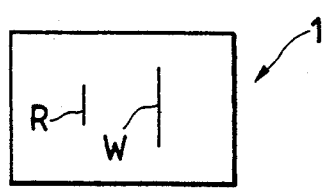
FIG. 1 is a front-elevational view of a magnetic head used in a tape edge detection method according to the present invention.

FIG. 1 shows a magnetic head 1 used for performing the tape edge detection method of the present invention. The magnetic head 1 is capable of reading after writing, the magnetic head 1 being hereinafter referred to as "read-after- write magnetic head". The magnetic head 1 has a write gap W and a read gap R which are arranged in juxtaposed relation to each other in the direction of travel of a magnetic tape 4. The write gap W is longer in the direction of the width of the tape 4 whereas the read gap R is shorter in the direction of the width of the tape. Thus, the magnetic head 1 is of the wide write-narrow read type.

Figure 2:
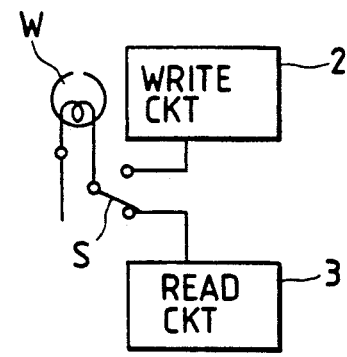
FIG. 2 is a circuit diagram of a selective connection means used in the present invention.

As shown in FIG. 2, a winding on a core having the write gap W is selectively connected to a write circuit 2 and a read circuit 3 by means of a switch S. Thus, the write gap W can be switched between one condition in which it performs the function of a write gap and another condition in which it performs the function of a read gap. The switch S constitutes means for selectively connecting the write circuit 2 and the read circuit 3 to the write gap W.

Figure 3:
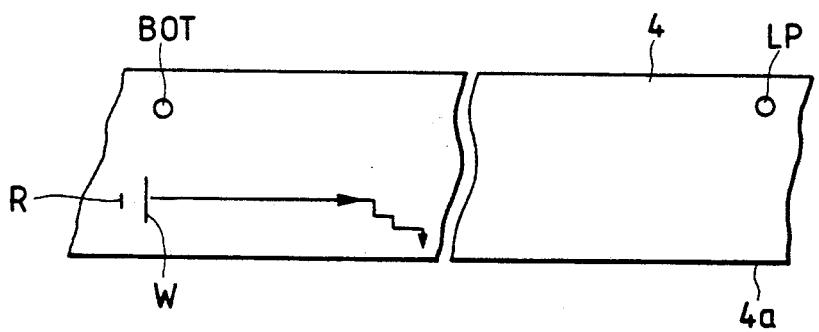
FIGS. 3 to 8 are illustrations respectively showing the steps of the tape edge detection method of the present invention.

A stepping motor (not shown) is operatively connected to the magnetic head 1 so as to move the magnetic head 1 in the direction of the width of the tape 4. The magnetic head 1 of the above construction is set in a predetermined initial position. This initial position means a position with respect to the direction of the width of the tape, and this initial position is predetermined in terms of a certain number of steps from the reference position of the stepping motor. On the other hand, the tape 4 is set in a start position. As shown in FIG. 3, this start position of the tape 4 can be detected by detecting a mark BOT (Begin of Tape), provided on the tape 4, by means of a photosensor which detects the tape running position.

Figure 4A:
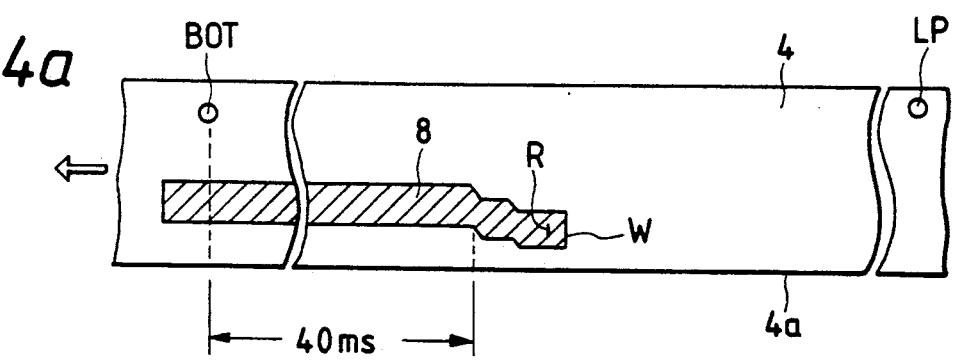
Figure 4B:
Figure 4C:
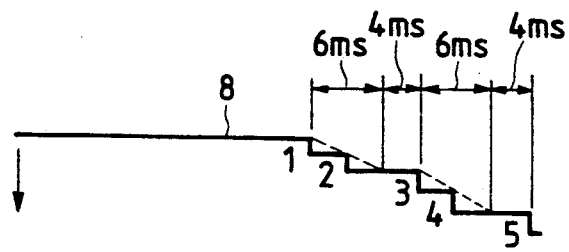

In this condition, the switch S shown in FIG. 2 is switched to the side of the write circuit 2, so that the write gap W performs the function of a write gap. The tape 4 is caused to run or travel in a direction of an arrow indicated in FIG. 4(a), so that a signal 8 is recorded on the tape 4 by the write gap W. As shown in FIG. 4(b), the signal 8 consists of read data pulses (RDP) which have a constant level and are generated at equal time intervals. The tape 4 is caused to run 40 meters while recording the pulse signal 8 on the tape 4, and subsequently the tape 4 is continued to be run to record the signal 8 while moving the magnetic head 1 in steps toward one edge 4a of the tape 4. The timing of starting the stepping movement of the magnetic head 1, as well as the timing of each stepping movement, is detected by counting the number of the pulses or tacho pulses of the recording signal 8. FIG. 4(c) diagrammatically shows the manner in which the signal 8 is recorded on the tape 4 while the magnetic head 1 is moved in the above-mentioned fashion.

The aforesaid stepping movement of the magnetic head 1, as well as the aforesaid recording of the signal 8, continues until the tape running position-detecting photosensor detects a load point mark LP provided on the tape 4. During this time, the write gap W and the read gap R are positioned outwardly of the edge 4a of the tape 4, as shown in FIG. 5.

Figure 5:
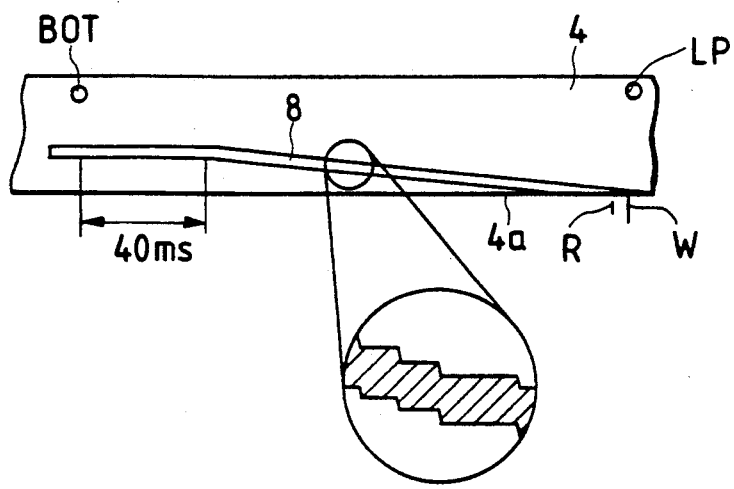

FIG. 5a is a blow-up of the circled portion of FIG. 5.

Figure 6:
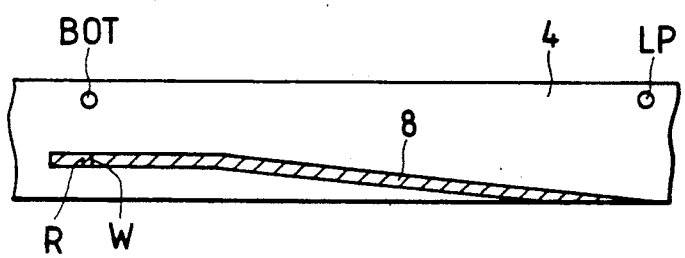

When the photosensor detects the mark LP as described above, the running of the tap 4 is stopped, and the tape 4 is rewound to the initial position, that is, until the photosensor detects the mark BOT. Also, the magnetic head 11 is returned to its initial position. The amount of movement of the magnetic head 1 in the direction of the width of the tape 4 has been memorized in terms of the number of steps taken by the stepping motor. Therefore, the stepping motor is driven in a reverse direction by the thus memorized steps, thereby returning the magnetic head 1 to its initial position. FIG. 6 shows the condition in which the tape 4 and the magnetic head 1 have been returned to their initial positions.

Figure 7:
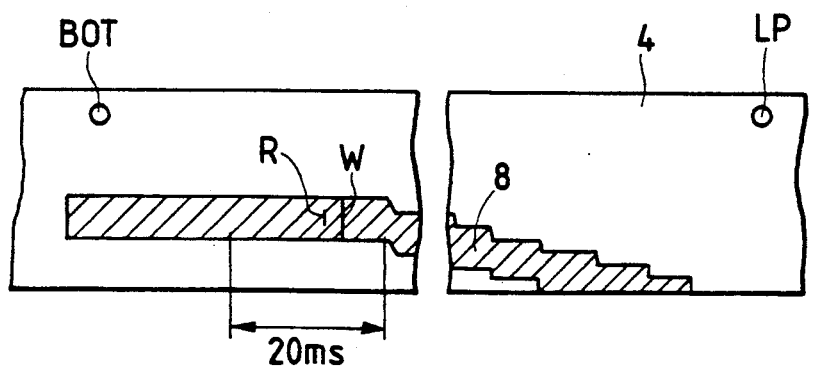
Figure 8:
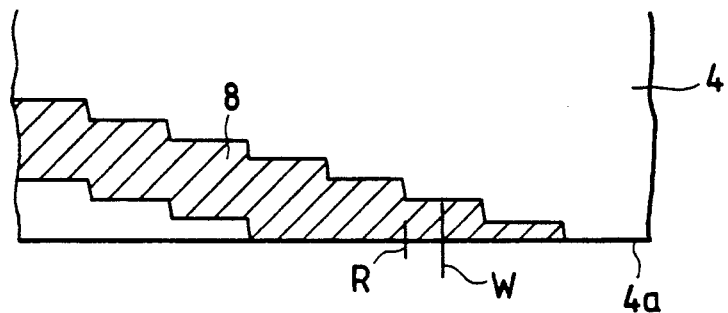

Then, the switch S shown in FIG. 2 is switched to connect the write gap W to the read circuit 3, so that the write gap W can perform the function of a read gap. In this condition, the tape 4 is again caused to run in the direction of the arrow in FIG. 4(a), so that the write gap W now serving as a read gap reads the recorded signal 8. As shown in FIG. 7, the reading output level with respect to 20 meters out of an initial portion of the thus running tape 4 is detected and is averaged to determine a reference level X which serves as a comparison reference for the detection of the tape edge. Subsequently, the tape 4 is continued to be run, and at this time the magnetic head 1 is moved, in steps counting the pulses of the signal 8, so that the magnetic head 1 can trace or follow the recording track of the preceding recorded signal 8 (see FIG. 8).

Figure 9A:
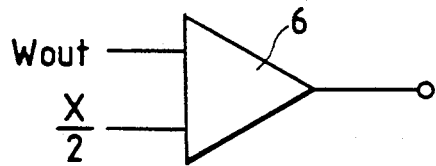
FIG. 9(a) is a circuit diagram of a comparator circuit; 9(b) is a diagrammatical illustration showing an output signal of the comparator circuit.
Figure 9B:
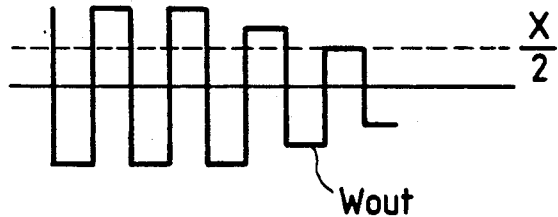

As shown in FIG. 9(a), the level of the signal Wout which is read by the write gap W during the stepping movement of the magnetic head 1 and then is outputted is compared with ½ of the aforesaid reference level X. As shown in FIG. 9(b), when the level of the signal Wout becomes equal to X/2, this position is determined as the position of the tape edge 4a.

Figure 10:
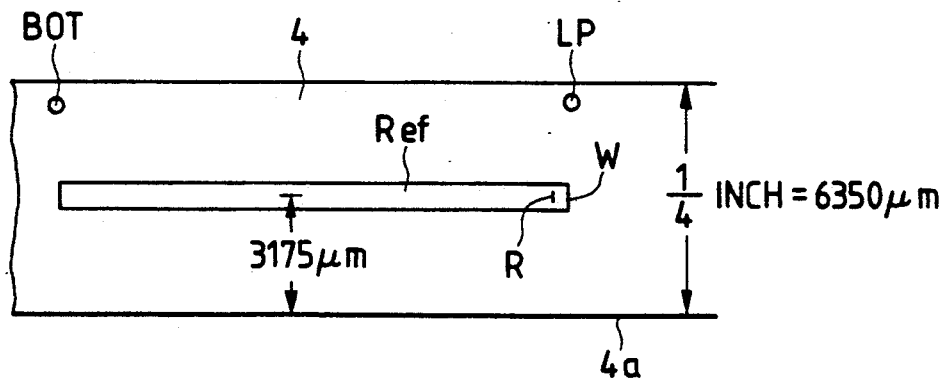
FIG. 10 is a fragmentary front-elevational of the tape, showing a reference signal determined based on the detected tape edge position.

When the position of the tape edge 4a is thus detected, a reference signal Ref is written onto that portion of the tape 4 spaced a predetermined distance from the detected edge position in the widthwise of the tape. For example, as shown in FIG. 10, the reference signal Ref is written on the central portion of the tape 4 of ½-inch width. Therefore, the reference signal Ref is written on this central portion having a centerline spaced a distance of 3175 $\mu$m from the tape edge 4a.

Each recording track is set, using the position of the reference signal Ref as a reference.

The features of the tape edge detection method of the above embodiment will now be described particularly by comparing this method with that described in the above-mentioned U. S. patent.

Figure 11A:
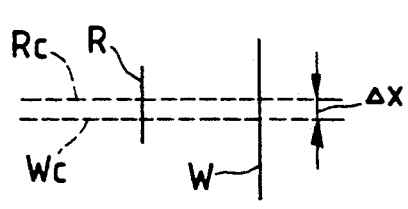
FIG. 11 are fragmentary front-elevational views of the tape, showing a comparison between the present method and a conventional method, and more specifically showing the effects caused by the offset of the write gap from the read gap.

In a single read-after-write magnetic head having a read gap R and a write gap W, the center of the write gap W is seldom in strict alignment with the center of the read gap R, and in most cases the two centers offset or deviate from each other in the direction of the width of the tape, as shown in FIG. 11(a). This deviation is represented by $\Delta x$.

Figure 11B:
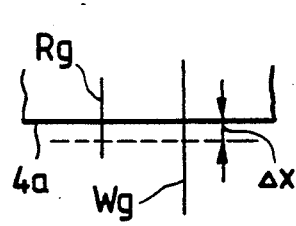
Figure 11C:
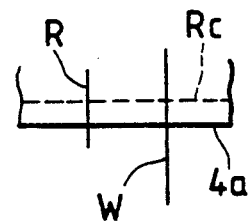
Figure 12A:
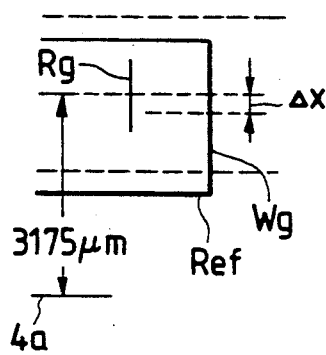
FIG. 12 are fragmentary front-elevational views of the tape, showing a comparison between the present method and the conventional method, and more specifically showing the reference signal set based on the detected tape edge position.

In the case of such a method as disclosed in the above-mentioned U. S. patent in which the signal is written by the write gap and at the same time the thus written signal is read by the read gap, if the position where the output of the read gap Rg becomes $\frac{1}{2}$ of the reference level X is set as the tape edge, the position of the tape edge 4a is detected based on the center of the read gap Rg regardless of the center of the write gap Wg, as shown in FIG. 11(b). As a result, the detected position of the tape edge 4a deviates an amount of x from the center of the write gap Wg. Therefore, when writing the reference signal on a given region of the tape, using the detected tape edge position as a reference, the reference signal is written with the center of the read gap Rg disposed in registry with the given region, and therefore the center of the write gap Wg which actually performs the writing of the reference signal Ref is deviated by an amount of $\Delta x$ in the direction of the width of the tape, as shown in FIG. 12(a). As a result, the reference signal Ref is written on that region of the tape deviated an amount of $\Delta x$ in the direction of the width of the tape. When the position of the reference signal Ref is thus deviated, the recording tracks to be set on the tape are also deviated an amount of $\Delta x$ in the direction of the width of the tape, and the track near to the tape edge 4a is disposed considerably close to the tape edge 4a which runs rather unstably. This is undesirable.

Figure 12B:
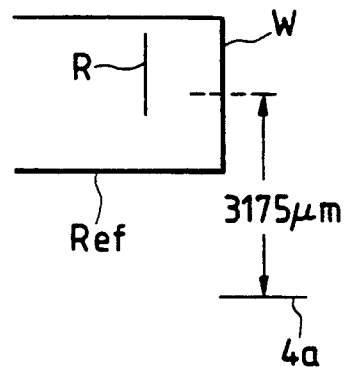
Figure 13:
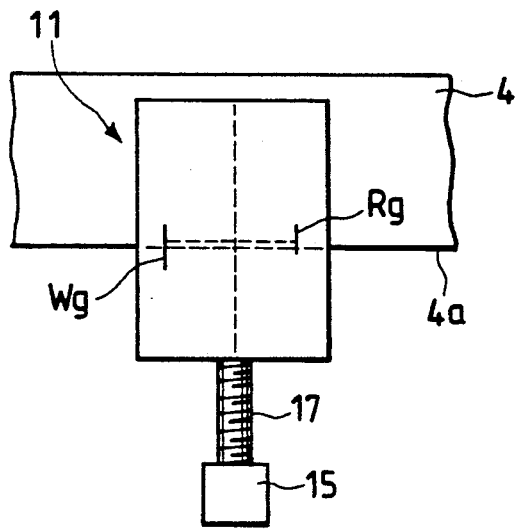
FIG. 13 is a front-elevational view of a magnetic head used in the conventional tape edge detection method.

On the contrary, according to the method of the present invention, the single write gap W can be switched to selectively perform the function of a write gap and the function of a read gap, so that the single gap can write the signal and read the thus written signal to detect the tape edge. Therefore, as shown in FIG. 12(b), if the position where the reading output level becomes equal to $\frac{1}{2}$ of the reference level X is set as the tape edge position, the position where the center of the write gap W is in registry with the tape edge 4a is detected as the tape edge, thus canceling the deviation $\Delta x$ of the center of the write gap from the center of the read gap. Therefore, when writing the reference signal Ref based on the detected tape edge position, the reference signal Ref is written on the proper position, so that the deviation of the tracks which would otherwise occur due to the relative deviation $\Delta x$ between the two gaps will not be encountered. Therefore, the magnetic head can be stably held in contact even with the recording track disposed near the tape edge.

The specific dimensions and times described in the above embodiment have been given merely by way of example, and the invention itself is not to be restricted to such embodiment.

As described above, in the present invention, the single write gap can be switched so as to selectively perform the function of a write gap and the function of a read gap, so that the single gap can write the signal and read the thus written signal to thereby detect the tape edge. With this method, even if the center of the write gap is offset or deviated from the center of the read gap, and even if an azimuth deviation develops when mounting the magnetic head on the tape drive device, such deviations do not affect the tape edge detection at all. Thus, the tape edge can be detected based only on a clear reference, that is, the single write gap. Therefore, when setting the recording tracks based on the detected tape edge position, the recording tracks will not be deviated in the direction of the width of the tape, which enhances the precision of the position of the written track.

What is claimed is:

1. A method of detecting an edge of a magnetic tape, using a magnetic head device comprising a magnetic head capable of reading after writing and having a read gap and a write gap, and means for selectively electrically connecting said write gap to a write circuit and a read circuit, said method comprising the steps of:

running said tape while moving said magnetic head from a predetermined initial position in the widthwise of said tape until said magnetic head reaches the edge of said tape to record a signal on said tape;

subsequently rewinding said tape to said predetermined initial position to return said magnetic head to a position of said tape where said signal has been recorded;

subsequently, under the condition of electrically connecting said write gap to said read circuit to cause said write gap to serve as a read gap, running said tape while causing said magnetic head to follow said signal recorded on the tape to read said signal; and subsequently comparing said read signal with a reference value to detect the edge of said tape.

2. A method of detecting an edge of a magnetic tape, using a magnetic head device comprising a magnetic head capable of reading after writing and having a read gap and a write gap, and means for selectively electrically connecting said write gap to a write circuit and a read circuit, said method comprising the steps of:

setting said magnetic head at a predetermined initial position and subsequently running said tape to initiate the recording of a signal on said tape with said write gap;

after running said tape for a predetermined period of time, moving said magnetic head in the widthwise of said tape while recording said signal on said tape until said write gap reaches the edge of said tape;

subsequently rewinding said tape to said predetermined initial position and returning said magnetic head to a position of said tape where said signal has been recorded;

subsequently, under the condition of electrically connecting said write gap to said read circuit to cause said write gap to serve as a read gap, running said tape and causing said magnetic head to follow said signal recorded on said tape to read said signal; and subsequently comparing said read signal with a reference value to detect the edge of said tape.

3. A method according to claim 1, in which said predetermined initial position of said head is determined based on a BOT (Begin of Tape) mark on said tape.

4. A method according to claim 1, in which said magnetic head comprises a wide-write/narrow-read head.

5. A method according to claim 2, in which said magnetic head comprises a wide-write/narrow-read head.

6. A method according to claim 1, in which said initial position of said magnetic head is determined according to the number of steps taken from a reference position of a stepping motor for moving said magnetic head in the widthwise of said tape.

7. A method according to claim 2, in which said initial position of said magnetic head is determined according to the number of steps taken from a reference position of a stepping motor for moving said magnetic head in the widthwise of the tape.

8. A method according to claim 1, in which said signal recorded on said tape comprises data pulses having a constant frequency and a constant level.

9. A method according to claim 2, in which said signal recorded on said tape comprises data pulses having a constant frequency and a constant level.

10. A method according to claim 1, in which the movement of said magnetic head in the widthwise direction of said tape is started after said tape has been run for a predetermined period of time; and in which the timimg of initiating the movement of said magnetic head in the widthwise direction of said tape is detected by counting data pulses of a constant frequency and a constant level recorded on said tape.

11. A method according to claim 1, in which said reference value is determined by detecting the reading output level at an initial stage of the reading of said signal and then averaging said reading output level.

12. A method according to claim 2, in which said reference value is determined by detecting the reading output level at an initial stage of the reading of said signal and then averaging said reading output level.

13. A method according to claim 2, in which the timing of initiating the movement of said magnetic head in the widthwise of said tape is detected by counting data pulses of a constant frequency and a constant level recorded on said tape.

* * * * *